Nov. 28, 1933.  R. J. BURROWS  1,936,708
AUTOMOBILE LIFT TRUCK
Original Filed April 19, 1923  11 Sheets-Sheet 2
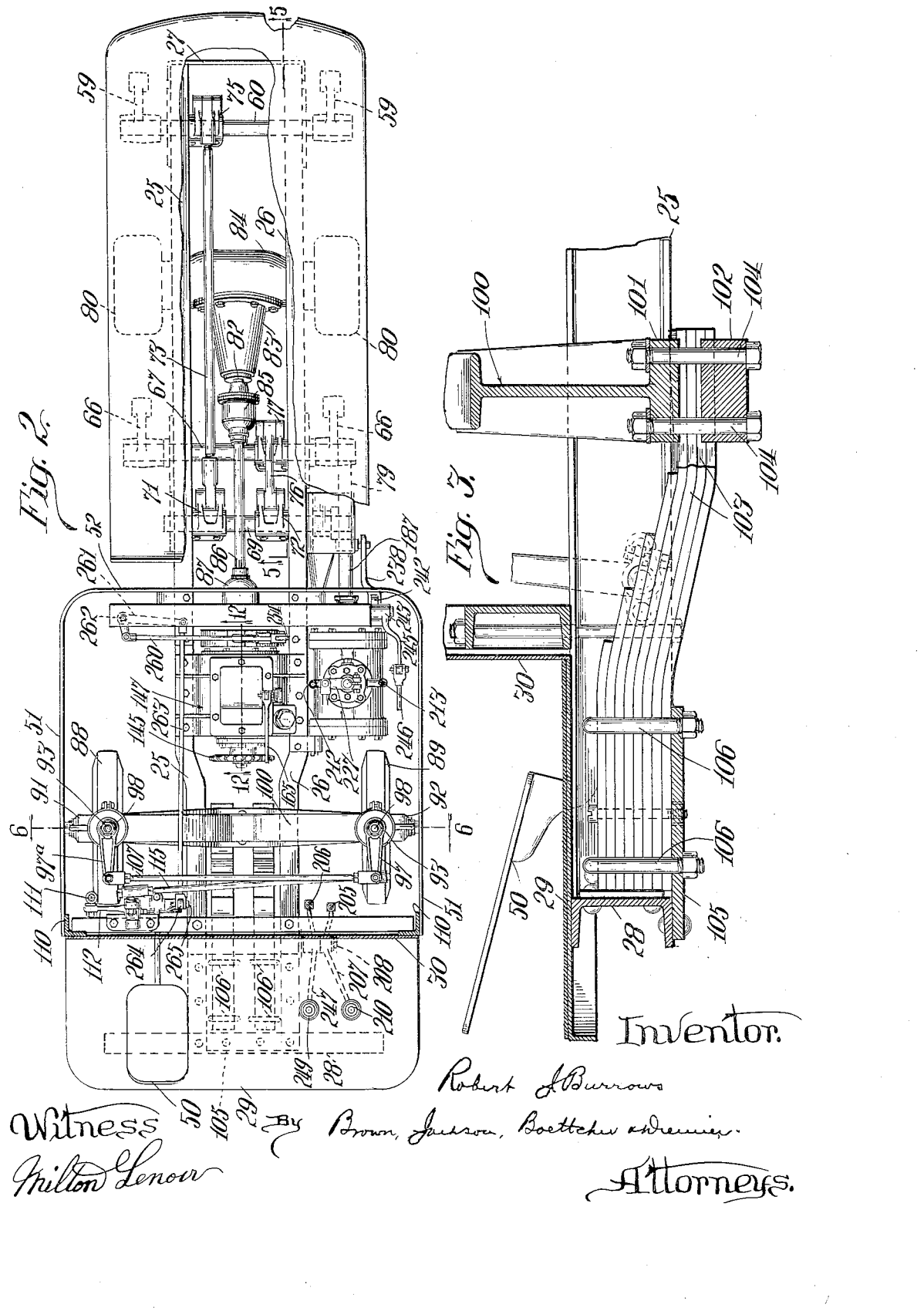

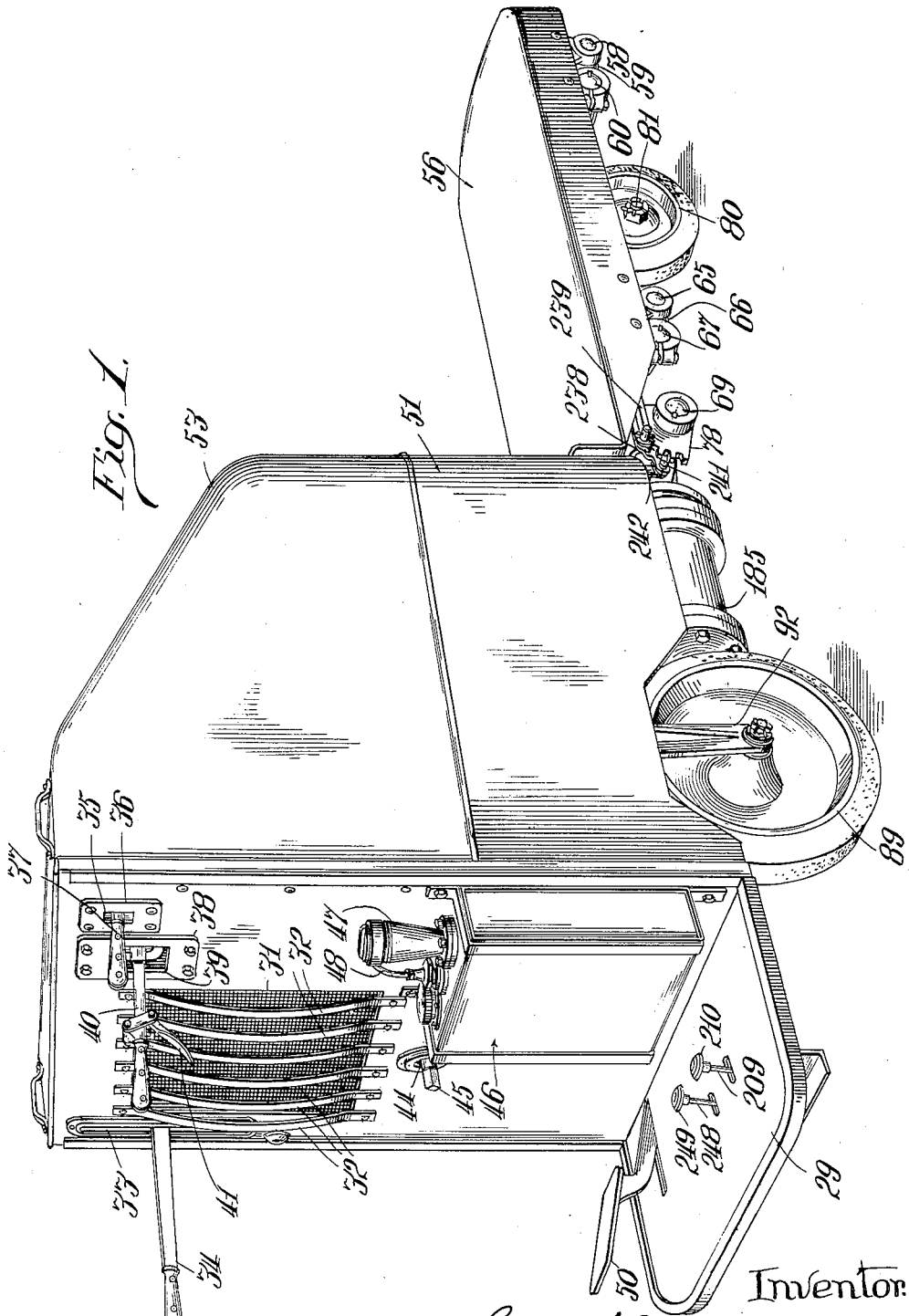

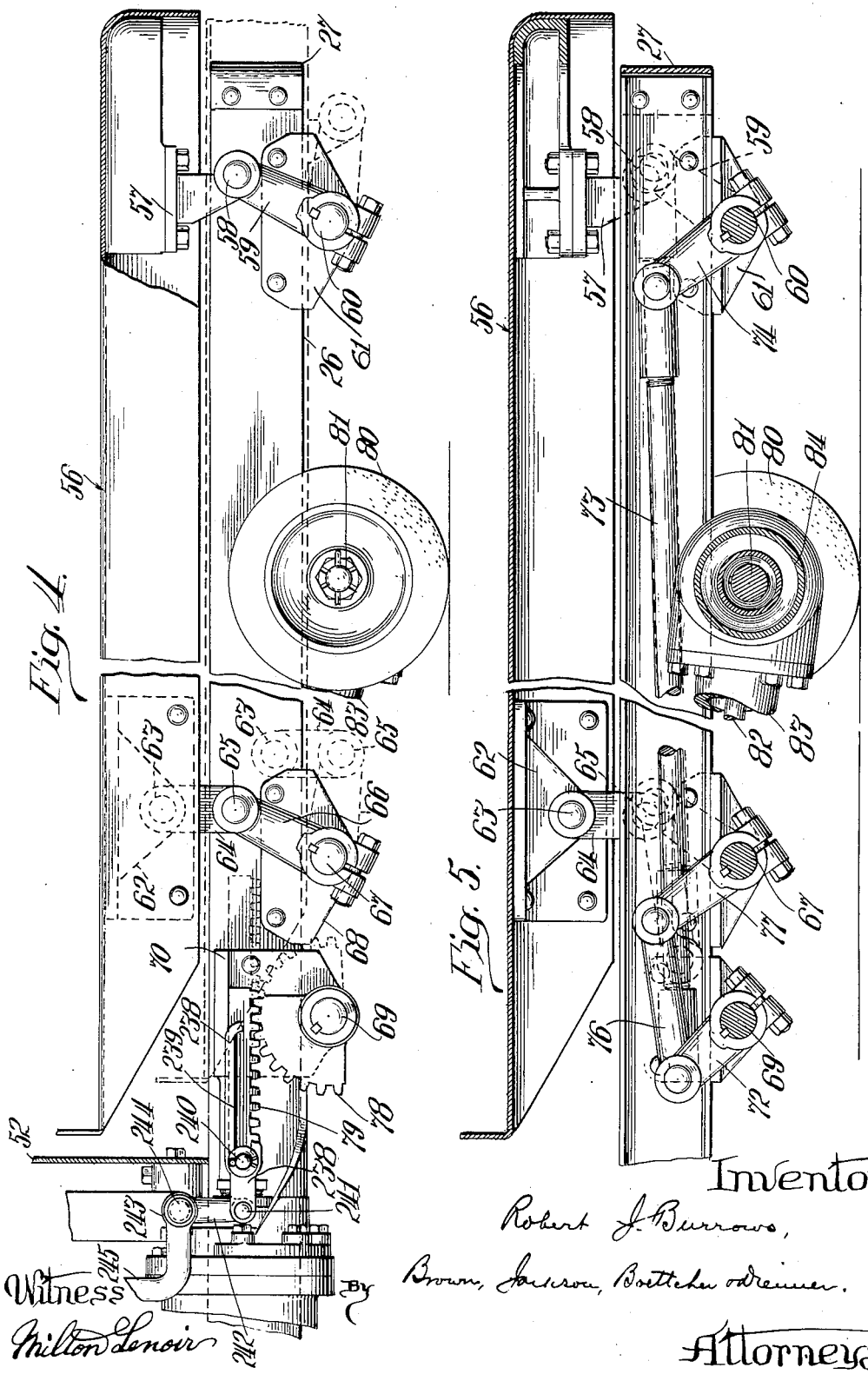

Nov. 28, 1933.  R. J. BURROWS  1,936,708
AUTOMOBILE LIFT TRUCK
Original Filed April 19, 1923  11 Sheets-Sheet 4

Witness
Milton Lenoir

Inventor
Robert J. Burrows
By Brown, Jackson, Boettcher & Dienner
Attorneys

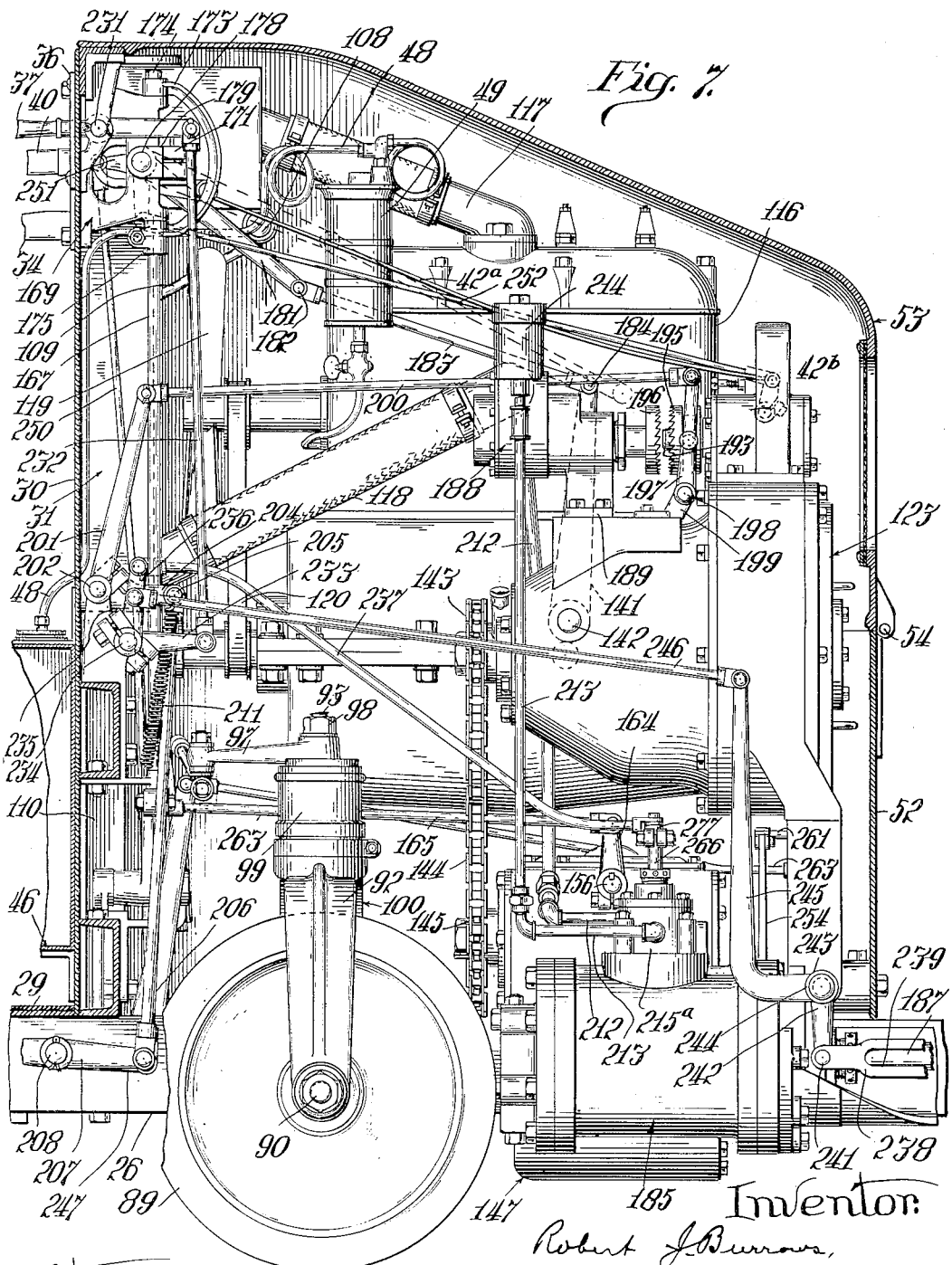

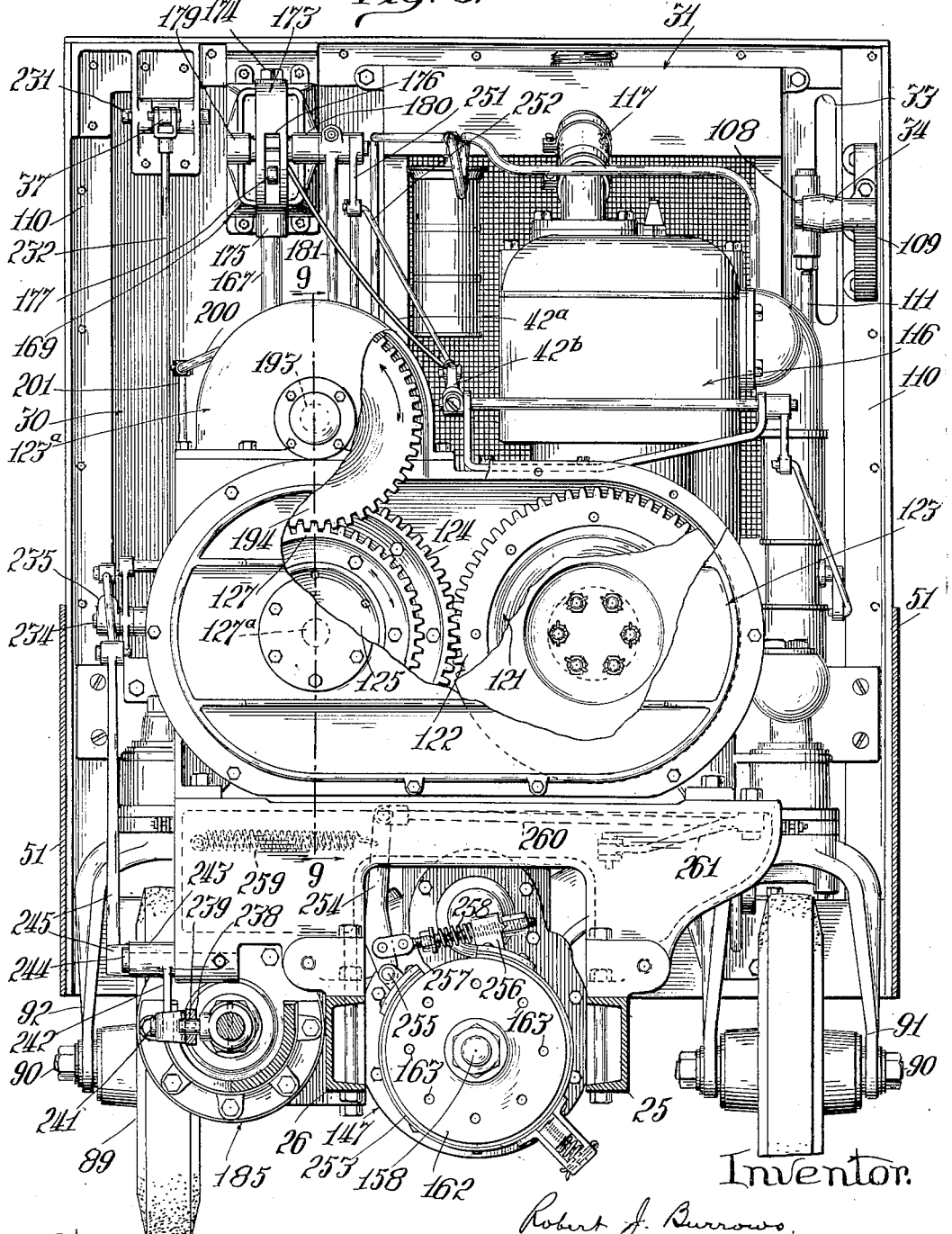

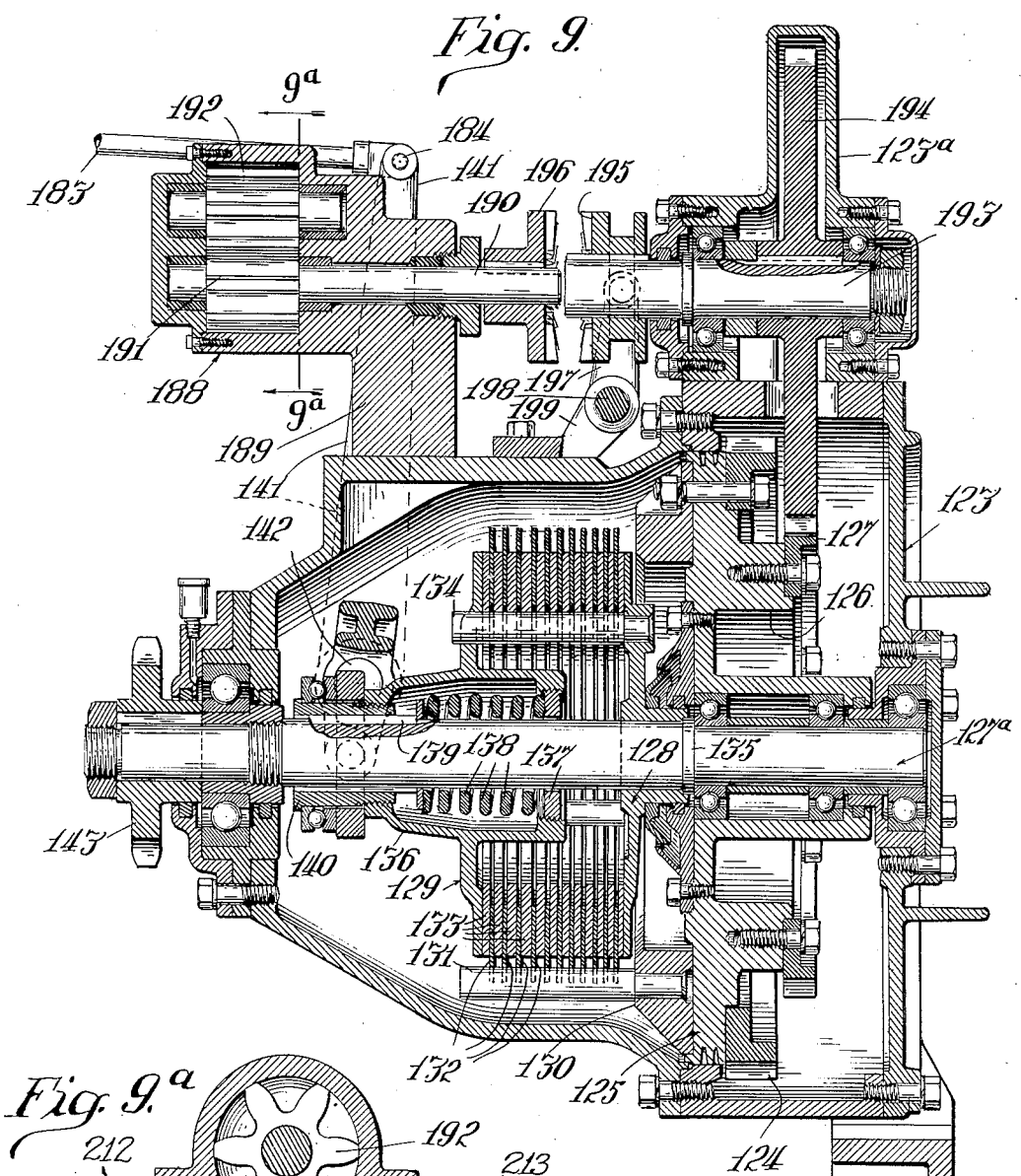

Nov. 28, 1933.  R. J. BURROWS  1,936,708
AUTOMOBILE LIFT TRUCK
Original Filed April 19, 1923   11 Sheets-Sheet 8
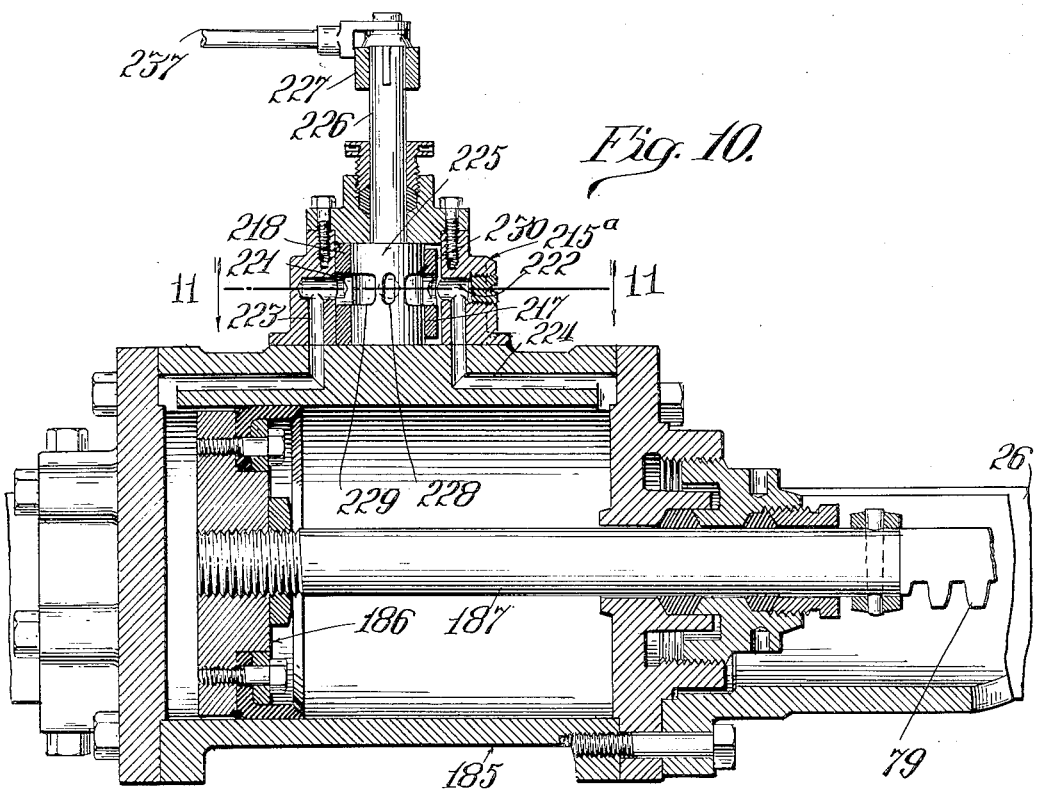
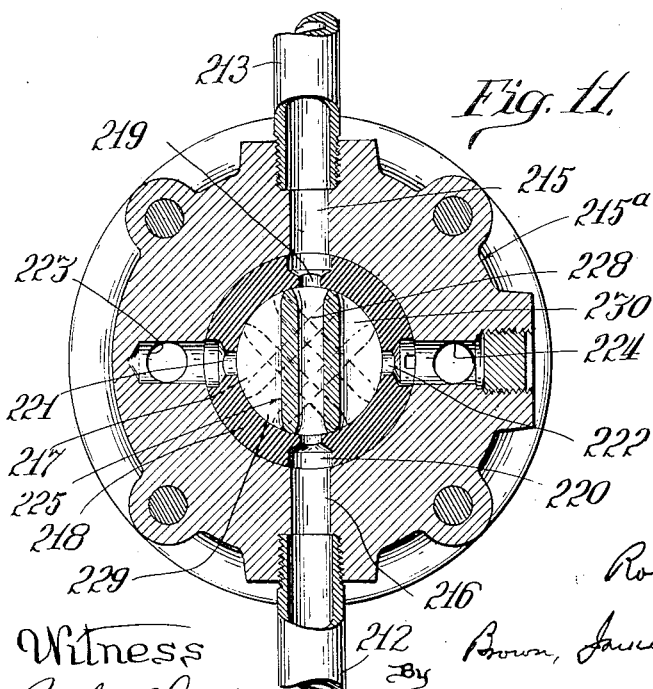

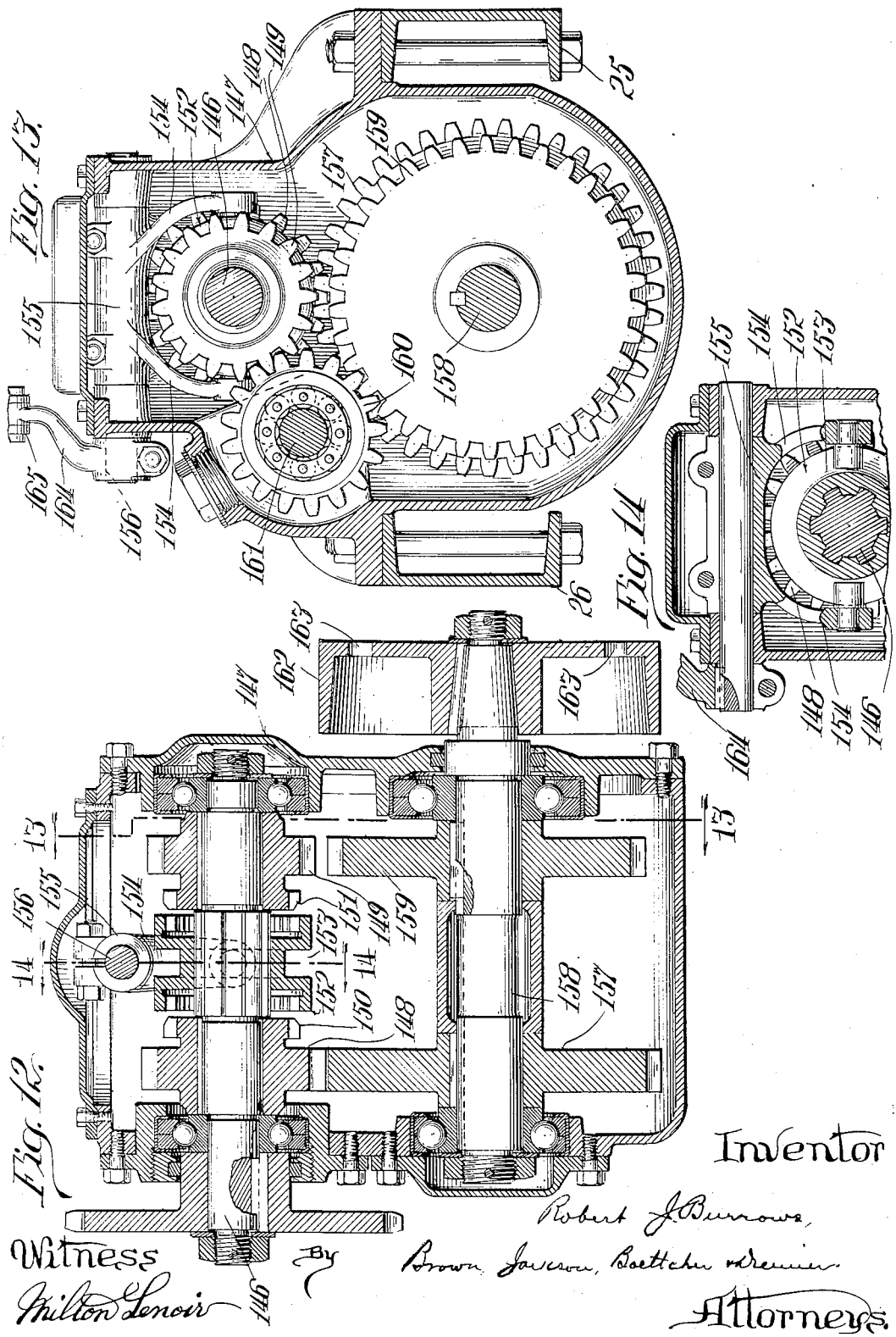

Nov. 28, 1933.  R. J. BURROWS  1,936,708
AUTOMOBILE LIFT TRUCK
Original Filed April 19, 1923  11 Sheets-Sheet 10
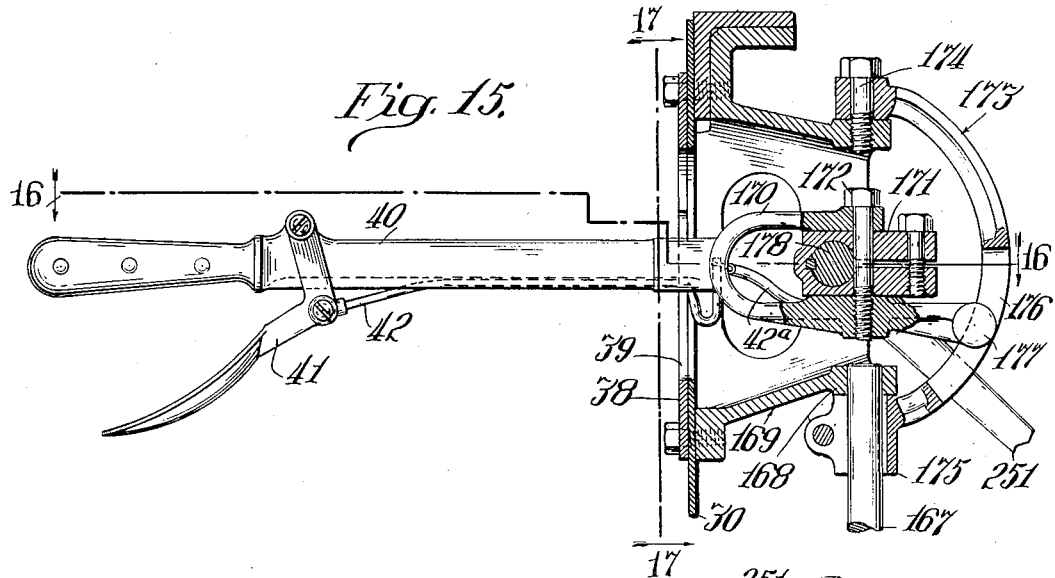
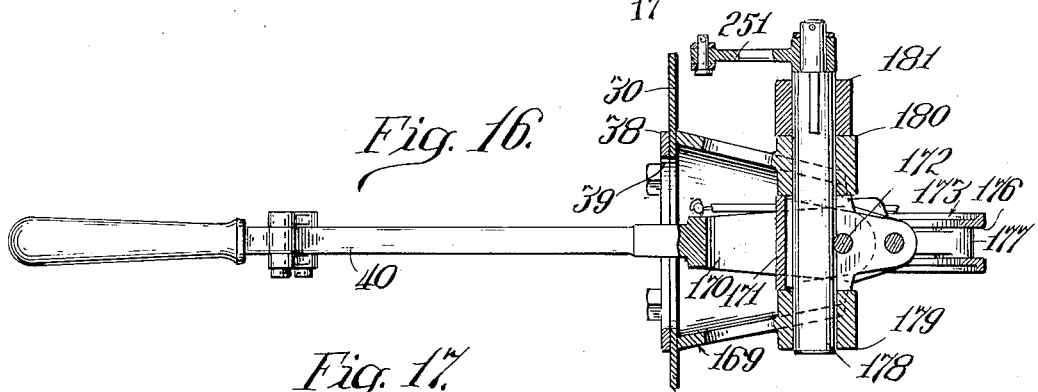
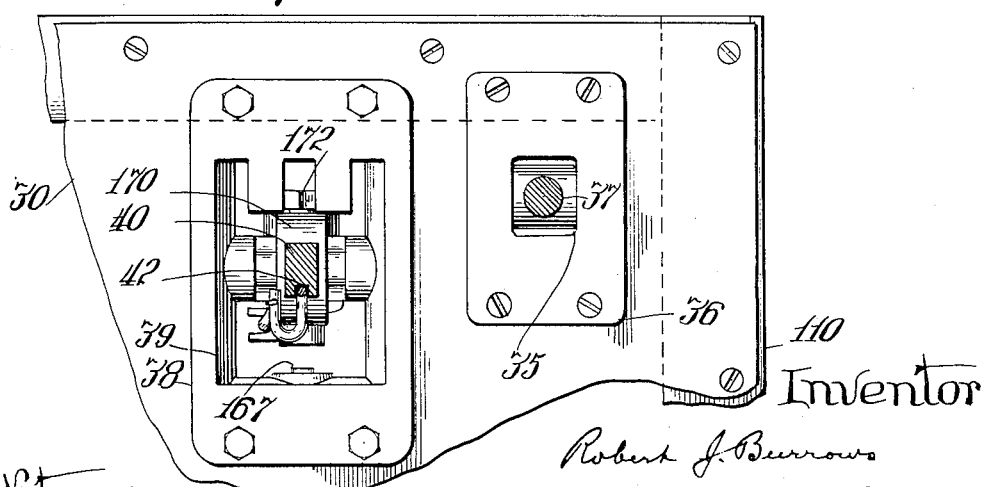
Inventor
Robert J. Burrows
Brown, Jackson, Boettcher & Dienner
Attorneys
Witness
Milton Lenoir

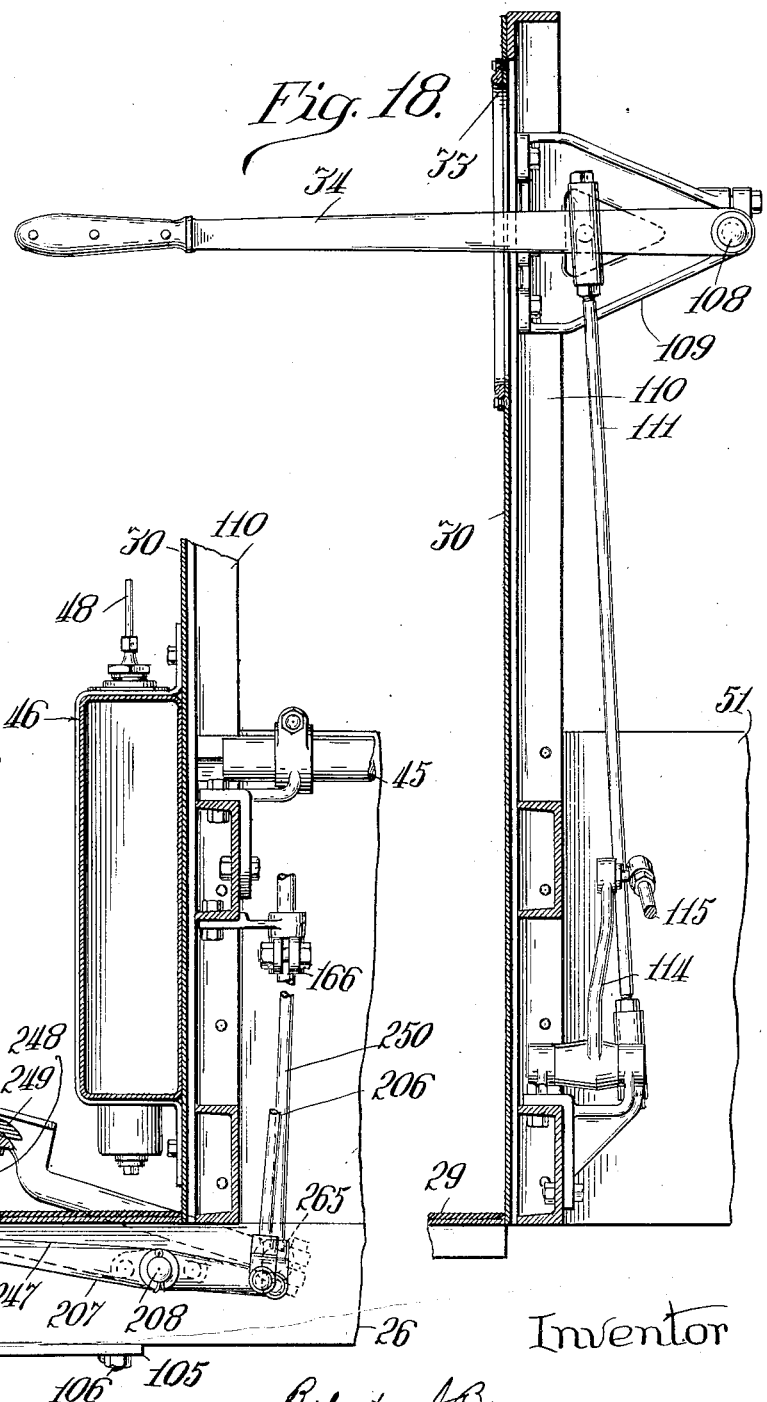

Patented Nov. 28, 1933

1,936,708

UNITED STATES PATENT OFFICE 1,936,708

AUTOMOBILE LIFT TRUCK

Robert J. Burrows, Buchanan, Mich., assignor to Clark Tructractor Company, Battle Creek, Mich., a corporation of Michigan Original application April 19, 1923, Serial No. 633,089, Patent 1,707,428, granted April 2, 1929. Divided and this application January 7, 1929. Serial No. 330,769

11 Claims. (Cl. 254—10)

This invention relates to lift trucks comprising a wheeled carriage on one end portion of which is mounted a motor and mechanism connected therewith, which motor and mechanism are employed not only for driving the carriage in the direction required, but also for furnishing the power for raising and lowering a load-sustaining platform that is movably mounted over the other end portion of the carriage. It has particularly to do with such lift trucks in which the requisite power for performing such operations is supplied by a motor of the internal combustion type, and has for its objects to provide improved means by which the power of such a motor may, under the control of an operator on the truck, be utilized for performing the various duties demanded of such trucks; to provide improved means for connecting the load-sustaining platform with the main frame of the carriage whereby such platform not only is adapted to be easily operated but will automatically adjust itself to any irregularities that there may be between the front and rear supports of the platform; to provide improved means that will act automatically at the completion of each rising and descending movement of the load-sustaining platform to shut off the flow of liquid to the cylinder in which is located the piston whose movement actuates such platform; and to improve generally the construction and operation of motor-propelled and operated lift-trucks. I attain these objects by the construction and arrangement of parts shown in the drawings and hereinafter particularly described. That which I believe to be new is set forth in the claims.

In the drawings,—

Fig. 1 is a perspective view of a lift-truck embodying my invention;

Fig. 2 is a plan view, some of the parts being broken away;

Fig. 3 is an enlarged sectional detail illustrating the spring-supporting means for the front or guiding end of the machine;

Fig. 4 is a side elevation of the rear portion of the truck showing the main frame and the lifting or load-sustaining platform, some parts being broken away;

Fig. 5 is a partial longitudinal section on the line 5—5 of Fig. 2, showing the main frame and the lifting platform with the devices by which the platform is supported;

Fig. 7 is a side view of the power plant—the hood and some portions of the frame of the machine being shown in section;

Fig. 8 is a rear view of the power plant, or in other words is a view of the parts shown in Fig. 7 looking to the left, the hinged portion of the hood being removed;

Fig. 9 is an enlarged detail, being a sectional view on line 9—9 of Fig. 8 and showing the transmission mechanism and the rotary pumping means;

Fig. 9a is a vertical section taken at line 9a—9a of Fig. 9;

Fig. 10 is a longitudinal vertical section of the cylinder and piston by which the platform is raised or lowered, the valve device that is associated therewith being also shown;

Fig. 11 is a horizontal section through the valve device shown in Fig. 10, the section being taken at the line 11—11 of Fig. 10;

Fig. 12 is a longitudinal vertical section on the line 12—12 of Fig. 2 and showing the gear means through which the direction of travel of the wheeled carriage is controlled;

Fig. 13 is a vertical section taken on the line 13—13 of Fig. 12;

Fig. 14 is a partial vertical cross-section taken on the line 14—14 of Fig. 12;

Fig. 15 is an enlarged partial vertical section on line 15—15 of Fig. 6 showing the lever by which the transmission clutch and also the gear mechanism for regulating the direction of movement are controlled;

Fig. 16 is a view partly in plan and partly in horizontal section of the parts shown in Fig. 15, the section being taken on the line 16—16 of Fig. 15;

Fig. 17 is a view partly in front elevation and partly in section of the parts shown in Fig. 15, the section being taken on the line 17—17 of Fig. 15;

Fig. 18 is a detail showing in side elevation the steering lever and some of the parts connected therewith, the dashboard through which such lever projects being shown in vertical section; and Fig. 19 is a detail illustrating the arrangement of the several foot levers at the front of the machine, the platform that the operator stands upon and the dashboard being in section.

Figure 6:
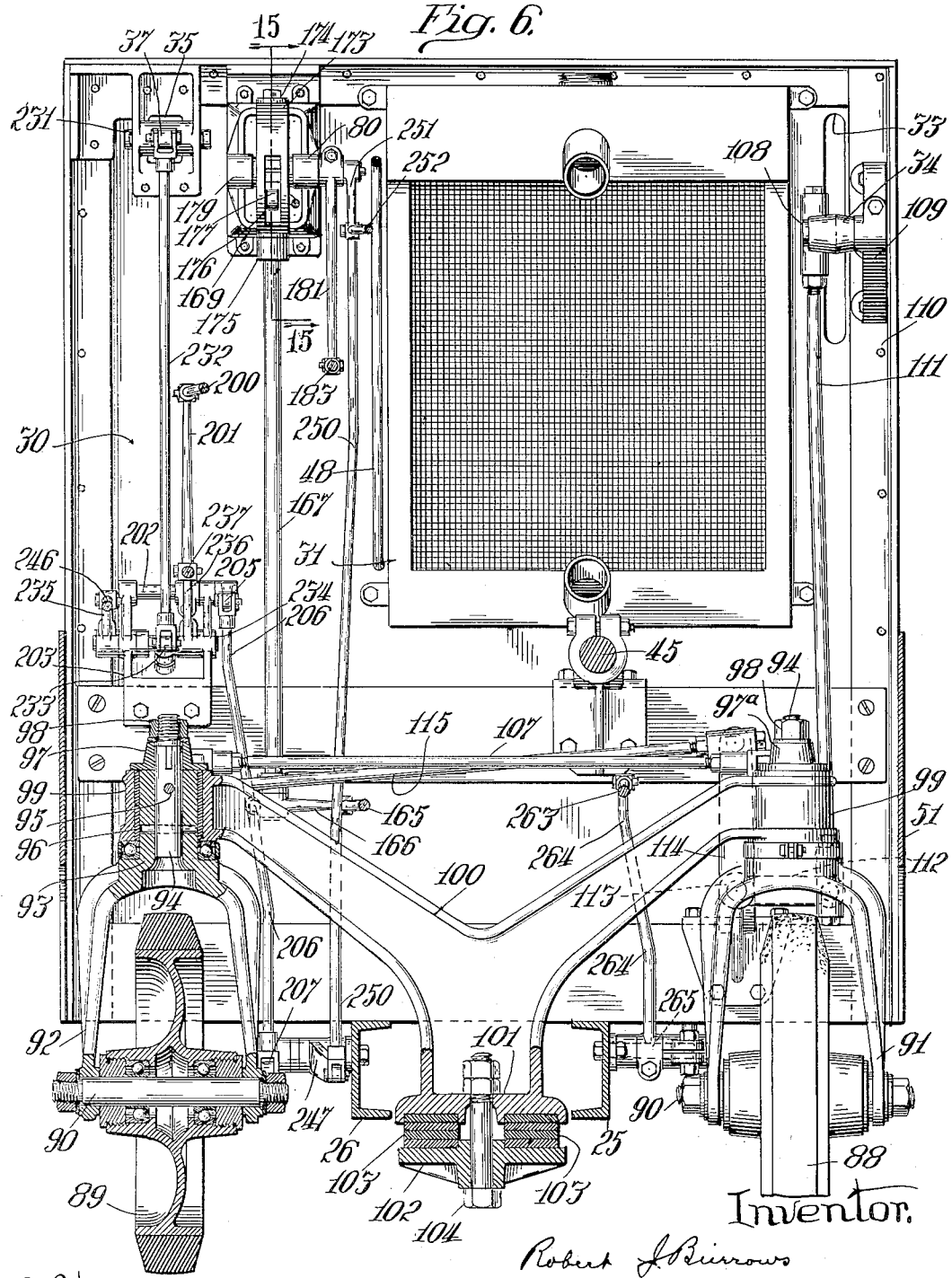
Fig. 6 is a vertical cross-section taken substantially on the line 6—6 of Fig. 2, showing a rear view of the dashboard and the radiator, and also the front or steering wheels, together with the devices by which such wheels are connected with the main frame and with the steering lever.

As shown in Fig. 2, the improved truck comprises a rigid main frame composed in part of two parallel side bars 25, 26 spaced a suitable distance apart, such spacing being preferably somewhat closer together at the forward portion than at the rear, which bars are connected at their rear ends by a cross-bar 27 and at their front ends by a cross-bar 28, which latter bar is shown in dotted lines in said figure. At the front end of the main frame is a platform 29 for the operator to stand upon, and rising from the rear margin of said platform is a vertically-disposed plate or dashboard 30 which forms the front wall of a housing or hood which encloses the operating machinery. The upper portion of the dashboard is provided with an opening through which is exposed a radiator 31 such as commonly used in automobile vehicles, for cooling the water which circulates around the motor cylinders, and, preferably, the radiator will be protected by a series of guard strips 32 as shown in Fig. 1. At the upper left hand corner of the dashboard 30 as viewed in Fig. 1 is a vertical slot 33 through which projects a steering lever 34, the connections of which will be hereinafter described, and at the opposite upper corner of said dashboard is a short slot 35 over which is fitted a guard plate 36.

Through this slot 35 extends a lever 37 which controls the raising and lowering of the lifting or load-sustaining platform, the connections of said lever being such that a movement of it in one direction will cause a raising of such platform, whereas a movement of it in the other direction will cause a lowering of such platform. In proximity to the slotted guard plate 36 is another plate 38 in which is a comparatively wide opening 39 that registers with a corresponding opening in the dashboard 30. Projecting through these last-named openings is a pivoted lever 40 adapted to be turned both vertically and laterally, and by its vertical movement control the clutch device that is incorporated in the transmission mechanism, and by its lateral turning control the gears that determine the direction of movement, either forward or back, of the wheeled carriage. Pivotally carried by this lever 40 is a hand latch member 41 through which, and the light rod 42 connected therewith, the usual valve or throttle on the motor may be controlled to regulate the speed at which the carriage moves. The various connections for these several levers will be described in detail later on herein. At 43 (see Fig. 1) there is shown mounted on the dashboard 30, and preferably near the lower end of the long slot 33, a hand operated switch for controlling the ignition circuit to the spark plugs of the cylinders in the usual manner, and below the opening for the radiator 31 is an opening 44 through which projects a crank connection 45 by which the motor may be cranked. At the lower right hand corner of the dashboard as it appears in Fig. 1, is a gasoline tank 46 secured in place in any suitable manner, which tank at its upper end is provided with an ordinary filler pipe 47 through which the tank 46 may be filled, and 48 indicates a pipe that leads from the gasoline tank to the engine, and preferably is connected with an ordinary vacuum feed tank 49, shown in Fig. 7, such as are commonly used in automobiles.

Extending over the operator's platform 29 and projecting therethrough is a foot lever 50, which, as will be hereinafter explained, is connected with a brake that is normally set by spring pressure, so that at such time the lever 50 will stand in its elevated position, as shown in Fig. 1. By pressing said lever to substantially the level of the surface of the operator's platform 29, the brake will be released, as will hereinafter appear. Ordinarily, the operator stands with one foot on said lever when he is operating the truck, but if he should step out of operative position, or descend from the platform 29, the lever 50 will be released and the brake be set. By this arrangement, therefore, danger of accident due to the brake not being set is materially reduced, if not eliminated.

The operating machinery is mounted on the main frame back of and adjacent to the dashboard 30, and is enclosed by a housing comprising side walls 51 and an end wall 52. These walls constitute the lower portion of the housing, the upper portion being formed of a box-like structure or hood 53 which is hinged at 54 to the upper margin of the rear wall, as shown in Fig. 7, so that it may be swung back over the rear portion of the truck to expose the operating machinery. The front portion of the hinged member 53 of the housing fits against the upper portion of the dashboard 30, and it is preferably provided at the top with handles 55 by which it may be conveniently moved into or out of enclosing position. The rear portion of this hood 53 is inclined, as shown in Figs. 1 and 7, so that the operator standing on his platform 29 has a clear view of the rear end of the truck, and, consequently, may steer it accurately when the truck is being driven in reverse, as will always be the case when the load is to be taken up.

At such times it is necessary for the operator to guide the load sustaining platform under the stationary frame on which the load is piled, which stationary frame is frequently in the form of a box that is supported on legs between which the load sustaining platform of the truck must be inserted. Consequently, if the truck should not be guided carefully it would be liable to hit one of the legs and not only damage the box but spill the load, with possible injury to bystanders. These trucks must also be driven through shops and in other places where space for maneuvering is very limited, so that very accurate steering is required, and, therefore, it is of the utmost importance that the operator have an unobstructed view of his surroundings, and by inclining the hood 53, as shown, this is provided for.

As shown in Figs. 1 and 2, the lifting platform, or platform on which articles to be transported are sustained, and which is indicated by reference numeral 56, overlies the rear portion of the main frame and extends from near the rear wall of the housing to the rear end of the truck. The side and rear marginal portions of the sheet metal of which this platform is composed, are turned down to form wide flanges, as clearly shown in Figs. 4 and 5, which flanged portions lie opposite to the side bars and rear bars of the truck frame, as indicated by dotted lines in Fig. 4, when the platform is in its lowered position. Adjacent to each of the rear corners of the platform 56 and depending therefrom is a bracket 57, and pivotally connected at 58 to each of these brackets is an arm 59.

The lower ends of these arms 59 are fixedly secured to end portions of a shaft 60 that extends across and beneath the frame of the truck and is journaled in brackets 61 that are respectively riveted to the side bars 25, 26 of the truck. Adjacent to the forward end of the platform 56 are secured at opposite sides two brackets 62, each of which is pivotally connected at 63 with the upper end of a short link 64, which at its lower end is pivoted at 65 to the upper end of an arm 66, which two arms correspond in size and shape to the rear pair of arms 59. The links 64 and arms 66 form, as will be understood, two pairs of toggles.

The lower ends of these forward arms 66 are fixedly secured upon a cross-shaft 67 that is journaled in depending brackets 68 riveted respectively to the longitudinally-extending bars 25, 26 of the main frame. By rotating the shafts 60 and 67, the two pairs of arms 59 and 66 may be swung vertically between the limits illustrated by the full line and dotted line positions of said parts, as shown in Fig. 4, thus raising or lowering the platform 56. The full line position shows such platform raised to approximately its extreme height while the dotted lines show its lowermost position. Of course, when such platform is raised or lowered it will also move endwise owing to the swinging of the arms 59 and 66 about their respective shafts 60 and 67 as their axes. For the purpose of rocking the shafts 60 and 67 to raise or lower the platform 56 a rock-shaft 69 is provided which extends across and below the main frame and is suitably journaled in supports carried by such main frame, preferably by means of brackets 70 shown in Figs. 4 and 5. This shaft 69 is provided with two cranks 71, 72 (see Fig. 2).

The crank 71 is connected by a connecting rod 73 with a crank 75 carried by the shaft 60, while the crank 72 is connected by a connecting rod 76 with a crank 77 on the shaft 67. It is evident, therefore, that by a rocking of the shaft 69 in either direction the two shafts 60 and 67 will be rocked correspondingly. While each arm 66 might, of course, be connected directly with the load sustaining platform 56, after the manner of the connection of the other pair of arms 59, yet it is desirable to interpose between the said platform and each arm 66 the pivoted link 64 because by reason of such links a certain degree of flexibility is had between the platform and the main frame which compensates for any slight irregularities in the distances between the front and rear supports of such platform, and thus increases the ease of operation as tendency of any of the parts to bind or stick is obviated. The rock-shaft 69 also has fixedly secured upon it, as clearly shown in Fig. 4, a segmental gear 78 which meshes with a rack 79 that is connected with the piston rod of a power-operated piston which will be hereinafter described. It will be understood, therefore, that by reciprocating such piston rod the shaft 69 may be rocked in one direction or the other, and thereby cause a raising or lowering of the lifting platform 56.

The rear portion of the main frame is supported by two wheels 80 mounted and keyed to opposite ends of a rear axle 81, said axle being journaled in suitable bearings provided for that purpose on the side bars 25, 26 of the main frame. These wheels are so located that, as best shown in Figs. 1 and 2, they respectively lie in close proximity to the downturned side marginal portions of the lifting platform.

The rear axle 81 will be provided with a bevel gear fast thereon as usual, with which will mesh a driving pinion carried at the rear end of a stub propeller shaft 82—a portion of which is shown in Fig. 5—which shaft will be mounted in suitable bearings in a housing 83. Preferably, the rear axle gearing will also be enclosed in a housing 84, as shown in Fig. 2. The stub propeller shaft 82 will be connected by a universal connection 85 with a main propeller shaft 86, which in turn will be connected by an ordinary universal connection 87 with drive gearing which will be hereinafter described. It will be understood, of course, that when the main propeller shaft 86 is rotated in one direction or the other the rear axle 81 will be correspondingly rotated, and, through the rear wheels 80, will propel the truck in one direction or the other.

The front portion of the main frame is supported by dirigible wheels 88, 89, the mountings and connections of which are best shown in Figs. 2 and 6. Referring particularly to Fig. 6, it will be noted that said wheels are shown as mounted on ball bearings running on shafts 90 carried respectively by yokes 91, 92. Each yoke is provided with a cylindrical stem 93, in which is an axially-disposed pin 94 keyed thereto, preferably by cross-pins 95, 96, as shown at the left-hand side of Fig. 6. Upon the vertical pins 94 are respectively mounted arms 97, 97$^a$, each of which is secured in place by a nut 98 screwed upon the upper end of the pin. Each stem 93 is journaled in a sleeve 99 carried at the opposite ends of an approximately Y-shaped cross-head 100, the lower end of the central vertical member of the Y-shaped cross-head terminating in a heavy base member 101.

This base member, or lower end of the said Y-shaped cross-head, has clamped between it and a heavy block 102, (see Fig. 3) the rear ends of two pairs of spring devices 103. Each set of spring devices 103 is composed of a plurality of heavy leaf springs superimposed one upon the other, and each set of such spring devices extends forward beneath the operator's platform 29 and is there firmly secured to the forward end portion of the main frame. The means for clamping the rear ends of the two sets of spring devices 103 between the base 101 of the cross-head and the block 102 are, as here shown, heavy bolts 104. The surfaces of the head 101 and block 102 are preferably recessed, as best shown in Fig. 6, to receive the spring devices. The two sets of spring devices extend forwardly in parallel relation and quite close to each other, as shown in Fig. 6, and at their forward ends rest upon a plate 105 which extends across the main frame and is riveted to the under flanges of the side bars 25 and 26 and the cross-bar 28 of such main frame, and the forward end portions of the spring members are embraced by U-bolts 106 that clamp them firmly to said plate 105. As the two sets of spring members 103 are comparatively narrow and lie rather closely together, as Fig. 6 shows, it will be evident that they furnish in effect a single point of support for the forward end of the truck frame and thereby, in connection with the points of support for the rear portion of the truck frame, afford a desirable three-point support which, as will be understood, is very desirable in that it permits the frame to accommodate itself to the unevenness of the floor or surface of the ground upon which it rests, thereby eliminating the danger of distortion or binding of the lifting mechanism, which might otherwise ensue.

Furthermore, the yielding character of this forward support is of importance as it, of course, tends to prevent the transmission of shocks and jars to the truck and its operating mechanisms.

The arms 97, 97$^a$ that have been before referred to and that extend forward, respectively, from the pins 94 to which they are keyed, are cross-connected by a connecting rod 107 which ensures turning of the yokes 91, 92 and their respective wheels in unison. These arms 97, 97$^a$ are actuated for steering purposes by a vertical movement of the steering lever 34, which, as shown in Fig. 18, is mounted upon a pivot 108 supported by a bracket 109 secured to one of two angle bars 110, which angle bars form the side margins of the dashboard, as shown in Figs. 2 and 6. The steering lever 34 is connected, by a rod 111 that depends therefrom, with one arm 112 of a bell-crank lever that, as shown in dotted lines in Fig. 6, is pivoted in place at 113 so that said bell-crank lever rocks in a transverse plane. The other arm 114 of this bell-crank lever is connected by a rod 115 with the arm 97—the connection with such arm 97 being by means of any ordinary ball joint that connects with the lower end of the same pivot pin that the rod 107 is connected with. It is obvious, therefore, that with the above described construction the moving down of the steering lever 34 will cause the bell-crank lever that is mounted on the pivot 113 to rock in clockwise direction as viewed in Fig. 6, thereby turning the yokes 91, 92 so that the truck will be guided to the right as viewed in said figure, and that upward movement of the steering lever from its central position will steer the truck in the opposite direction.

Therefore, the operator standing on his platform 29 may steer the truck by simply moving the lever up or down. This, of course, leaves his other hand free for operating the other two control hand levers, which, as shown in Fig. 1, are located adjacent the other side of the dashboard.

The mechanism for propelling the truck comprises an internal combustion engine 116 of the kind used in automobiles, which engine in the illustration is shown as being of the water cooled type, the connections between the water jacket of the engine and the upper and lower portions of the radiator 31 being indicated by 117 and 118, respectively. Associated with the engine and radiator is a fan 119 which may be driven by a belt 120 in the usual way for causing a current of air through the radiator. As the various parts and connections of motors of this description are well understood, it is deemed unnecessary to describe them except in so far as they have to do with operations characteristic of the machine which forms the subject-matter of this application. The several pistons of the engine operate in the usual way to drive a crank shaft that extends longitudinally of the truck, on which crank shaft at one end will be secured, as usual, a flywheel 121, to the outer face of which is bolted a large gear 122, that, together with other members of the transmission mechanism, is tightly enclosed in a casing which is indicated generally by 123. This large gear 122 is in mesh with and drives a gear 124. This gear 124 is, in the construction shown, in the form of a ring that, as shown in Fig. 9, is bolted to the face of a large wheel or disc 125.

To an annular member 126 of said wheel 125 that projects out from the same side thereof as that on which the gear ring 124 is attached, is bolted another gear ring 127 of less diameter than the gear ring 124. This wheel member 125 which, through its gear ring 124 is connected with the large gear 122, is rotatably mounted on a countershaft 127a, ball bearings being preferably interposed between the extended hub of the wheel 125 and said shaft. This shaft is journaled in the end walls of the casing 123, and at its ends it is preferably provided with ball bearings, as shown in Fig. 9. The smaller gear 127 carried by the wheel 125 is used, as hereinafter described, in connection with the driving of the pump. To connect the wheel 125 that carries the gear rings 124 and 127 with the shaft so that such wheel and shaft will rotate together when required, I make use of an ordinary friction clutch mechanism that is mounted on the shaft, which mechanism as here shown, comprises two annular parallel plates or heads 128, 129 spaced apart and having a plurality of friction rings interposed between them, some of said rings being connected with the said plates or heads and the remainder being connected with the wheel 125 through a ring 130 that is bolted to said wheel, which ring 130 carries a number of forwardly-projecting pins 131 that engage in notches in the outer edges of certain of the friction rings that are here indicated by 132. The other and smaller ones of the friction rings, and which alternate with the larger friction rings, are indicated by 133, and their inner edges are notched to engage over pins 134 that extend between the two plates or heads 128, 129, and on which pins the plate or head 129 is adapted to be moved back and forth.

The hub of the plate or head 128 bears against a collar 135 formed on the shaft, and the hub of the plate or head 129 is enlarged to form a chamber 136. One end of this chamber is closed by a cap 137 screwed into the end of the chamber, and against this cap bears one end of a heavy coiled spring 138 that at its other end bears against splines seated in grooves in the shaft, which splines non-rotatably secure to the shaft a sliding collar 140 upon which the forward end of the chambered hub of the plate or head 129 is secured, by screwing it thereto as shown, or otherwise. It will be evident that when the plate or head 129 is forced inward so as to press the several friction rings into close engagement the wheel 125 will be clutched to the shaft and rotated with it, but at other times will be free from such shaft. This clutching engagement is effected through the turning of a shifting lever 141, by means hereinafter described, such lever being pivoted at 142 and provided at its lower end with a yoke which straddles and engages the sliding collar in the ordinary manner.

Fast on the projecting end of the shaft 127a is a sprocket 143 over which runs a sprocket chain 144 (see Fig. 7), which also engages another sprocket 145 which is mounted upon and keyed to the front end of a shaft 146 which forms a part of the transmission mechanism through which the truck is driven in either its forward or reverse directions. This transmission mechanism or driving gearing is best shown in Figs. 12, 13 and 14, and as there shown is contained within a casing indicated generally by 147, which casing will be suitably secured to the main frame.

Loosely mounted upon the shaft 146 adjacent to opposite sides of the casing are spur pinions 148 and 149 which are respectively provided at their inner sides with clutch members 150 and 151 respectively, and between said clutch members is a double-faced clutch 152, which is mounted slidingly but non-rotatably on the shaft 146. This clutch member is adapted to be moved alternatively into engagement with the clutch members 150 and 151, and it normally occupies an intermediate position out of engagement with both, as shown in Fig. 12. The clutch member 152 is shown as provided with an annular groove 153 adapted to receive inwardly-projecting ends or trunnions that are carried by a yoke 154 that forms part of a sleeve 155 mounted on a rock-shaft 156, which extends transversely of and over the central portion of the shaft 146 and is suitably journaled in the casing 147. By rocking said shaft 156, therefore, the clutch member 152 may be moved to connect either of the pinions 148, 149 with the shaft 146. The pinion 148 is in constant mesh with a large gear 157 that is mounted upon and keyed to one end portion of the drive shaft 158 journaled in the lower portion of the casing 147. Also mounted on and keyed to this drive shaft 158 is a smaller gear 159 which is in line with the pinion 149 but does not directly mesh therewith. These two gear members 149 and 159 are, however, connected by a pinion 160 that is carried by a countershaft 161, as clearly shown in Fig. 13. Obviously, when the shaft 146 is rotated and the pinion 149 is connected therewith by means of the clutch member 152, the drive shaft 158 will be rotated through the instrumentality of the reverse gear 160.

When, however, the pinion 148 is connected with the shaft 146 through the clutch member 152 the drive shaft 158 will be directly rotated through the gear 157. The direction of rotation of the drive shaft 158 may, therefore, be controlled by shifting the clutch member 152 so as to connect one or the other of the pinions 148, 149 with the shaft 146. The drive shaft 158 carries at its rear end, which is the right hand end as shown in Fig. 12, a drum 162 which is suitably keyed thereon and is connected with the propeller shaft 86 by means of the universal coupling 87, as shown in Fig. 2. The coupling housing will preferably have a radial flange adapted to fit against the outer face of the drum 162 and be secured thereto by bolts passing through such flange and bolt holes in the drum, such as are indicated at 163 in Fig. 12. Said propeller shaft will, therefore, form substantially a continuation of the drive shaft 158.

The shifting of the clutch member 152 for operatively driving the gear mechanism therein, is accomplished by a manipulation of the hand lever 40 that extends through the dashboard, and also by a manipulation of the same lever the friction clutch means contained within the casing 123 is controlled. Referring now to the shifting of the clutch member 152 for accomplishing the desired driving connection of the shaft 158, it will be seen by reference to Figs. 7 and 13, that the rock-shaft 156 has secured to a projecting end thereof an arm 164 which is connected by a rod 165 with a laterally-extending arm 166 (Fig. 6) secured to the lower end of a vertical shaft 167. The upper end of this shaft is journaled in a bearing 168 in a bracket 169 that is fastened to and extends out from the rear face of the dashboard 30, as shown in Fig. 15.

The lever 40 that projects through the dashboard, projects also between the walls of the bracket 169, and such projecting end is made in the form of a yoke, as shown at 170, which embraces a block 171 and to which block the yoke portion of the lever is pivotally connected by a vertically-disposed pin 172. A segmental vertically-disposed arm 173 projects beyond the bracket 169 and is pivotally connected therewith by a pivot 174 at its upper end, which is in alinement with the shaft 167, the lower end of said segment having a head 175 through which the shaft 167 passes and with which shaft such head is fixedly secured, whereby the shaft and segment will turn together. The segment has a slot 176 therein into which projects an arm 177 that is formed with the lower member of the yoke portion 170 of the lever 40, and by reason of the projection of such arm into the slot it will be evident that a side swing of the lever will cause a swinging of the segment, and hence a turning of the shaft 167. By reason of such turning of the shaft the clutch member 152 will, of course, be moved along its shaft 146 to engage one or the other of the clutch devices of the pinions 148 and 149. If the lever 40 is turned in one direction it will, of course, cause an operative engagement of the clutch 152 with one of such pinions, whereas if the lever is turned in the other direction the other pinion will be engaged, and, depending upon which one of the pinions 148, 149 is so engaged, the drive shaft 158 will be rotated to drive the truck either forward or backward.

For moving the friction clutch mechanism that is shown in detail in Fig. 9, and through which the rotation of the gear shaft 146 is controlled, as before explained, a movement of the lever 40 in a vertical direction is necessary. By reference to Figs. 15 and 16, it will be seen that passing transversely through the block 171 that the inner yoke-like end of the lever 40 is connected with as described, there is a short shaft 178 that is keyed or otherwise non-rotatably connected with said block 171. Said shaft is journaled in bearings 179 and 180 in the side walls of the bracket 169, and it is obvious that when the lever 40 is moved vertically it rocks upon said shaft 178 as an axis. Keyed to a projecting end of the shaft 178, so as to rock therewith, is an arm 181, which, as clearly shown in Fig. 7, extends in a downward direction, and pivoted at 182 to the end of this arm is a connecting rod 183 which at its other end is pivoted at 184 to the upper end of the shifting lever 141 (see Fig. 9). The arm 181 and connecting rod 183 normally stand at a slight angle to each other, as shown in Fig. 7, and it is evident that by the operator swinging the operating lever 40 vertically the arm 181 will be rocked. Upward pressure on the outer end of the lever 40 will, as will be evident from an inspection of Fig. 7, carry down the arm 181 and exert a pull on the connecting rod 183 that will so turn the shifting lever 141 on its pivot 142 as to force the sliding collar 140 rearwardly on its shaft 127ª against the pressure of the heavy coiled spring 138, and thus cause the required frictional engagement between the two sets of friction rings 132 and 133.

To throw the clutch device out of operative engagement the operating lever 40 will be pushed down, and as it approaches the lower end of the opening 39, the arm 181 and connecting rod 183 will be brought into alinement, and thereafter a further slight downward movement of such operating lever 40 will carry their connecting pivot 182 slightly beyond the plane passing through the point of connection of the arm 181 with the shaft 178 and the point of connection of the rod 183 with its shifting lever 141, and immediately upon that movement taking place the effect of the heavy coiled spring 138 will be to hold these parts 181 and 183 out of alinement—their position then being approximately as indicated by the dotted lines in Fig. 7. The two members 181, 183 thus constituting the two arms of a toggle lever, and the "passing centers" of these parts in the throw-off of the clutch mechanism in the casing 123, and the holding of the parts in such dotted line position, is a matter of considerable importance, as it ensures the clutch being positively and strongly held out of operative position until it is desired to again have the truck moved under power. As will be understood by a reference to Fig. 15, the upper end of the slot 176 in the segment 173 serves as a means to limit the upward throw of the arm 181, whereby the parts will, in the inoperative position, not pass farther than is necessary or desirable into the past-center position that has been described.

As hereinbefore stated, the raising and lowering of the load-sustaining platform 56 is effected through a rack bar 79 that is connected with the piston rod of a piston, and the devices by which this rack bar is reciprocated for controlling the position of the platform will now be described.

Referring now particularly to Figs. 7 and 10, 185 indicates a fluid-pressure cylinder which is suitably mounted on the frame of the machine, and preferably at one side of the casing 147, as shown in Figs. 7 and 8, and 186 indicates a piston operating in said cylinder and having a piston rod 187 which extends rearwardly of the truck through the rear head of the cylinder, and is connected with the rack bar 79 as shown in Fig. 4. Reciprocation of the piston 186 will, therefore, reciprocate said rack bar, and consequently will raise or lower the platform 56 as before explained. The piston 186 is designed to be operated by oil pressure supplied by an oil pump, the casing of which is indicated by 188, and which is suitably supported by a pedestal 189 carried by the friction clutch casing 123. This oil pump is preferably of the gear type and comprises a shaft 190 upon which is mounted a gear member 191 that meshes with another gear member 192, and which two gear members constitute the pump proper. As shown best in Fig. 9, the pump shaft 190 is in alinement with another shaft 193 upon which is keyed a large gear 194 that is in constant mesh with the smaller gear ring 127 that is carried by the wheel 125, and hence will be driven thereby. The large gear wheel 194 is partly enclosed by the housing 123 and partly by another housing section 123ª bolted thereto, as shown in Fig. 9. As shown in said Fig. 9, there is non-rotatably but slidingly secured upon a projecting end portion of the shaft 193 a clutch device 195 which is adapted to be moved into clutching engagement with a clutch member 196 that is non-rotatably secured upon a projecting end portion of the pump shaft 190, and when such clutch members are in engagement the pump shaft, of course, will be rotated.

The sliding clutch member 195 is adapted to be moved into and out of clutching engagement through the medium of a shifting lever 197 that is pivoted at 198 to a bracket 199, as shown in Fig. 9, which shifting lever has the usual engagement with a groove in the said clutch member. The shifting lever has connected with it, as best shown in Fig. 7, a connecting rod 200 that extends forward toward the dashboard, where it is connected to the upper end of an arm 201 that at its lower end is secured to a short rock-shaft 202 mounted in the upper ends of the side arms of a bracket 203, from which rock-shaft there projects an arm 204 to the outer end of which is attached a rod 206, (see Fig. 6) that at its lower end is connected with the rear end of a short foot lever 207, whose pivot, 208, extends out from one of the side bars of the main frame, and whose forward end extends beneath the operator's platform, as shown in Fig. 19, and carries an upwardly-projecting rod 209 that extends through an opening in said platform. A head 210 will preferably be mounted on said rod, and it will be evident that through the means described the operator, by pressing down upon such head, can throw the clutches 195 and 196 into engagement for the purpose of driving the pump. As shown in Fig. 7, a coiled spring 211 that at its upper end is connected with the arm 204 and at its lower end with a fixed member will normally keep the clutch parts 195 and 196 held apart.

At opposite sides of the pump casing 188 are openings into which pipes are secured for conveying the oil that is circulated by the pump between it and the cylinder 185. The pipe that carries the oil into the pump casing 188 is indicated by 212, and the pipe that conveys it therefrom is indicated by 213 (see Fig. 9ª).

While the oil is used continuously, of course, yet to compensate for such loss as may occur from time to time from the system, there is provided a small reservoir 214, in which is a supply of oil, said reservoir being connected by a suitable pipe with the pipe 212. (See Fig. 7).

When the pump is in operation oil is forced out from the pump casing 188 through the pipe 213, which at its lower end connects with an inlet port 215 in a valve box 215ª that is mounted upon the cylinder 185, and the pipe 212 from the pump extends to and communicates with an outlet port 216 at the opposite side of the valve box, as best shown in Fig. 11. The two ports 215, 216 communicate with a valve chamber 217 in said box, in which chamber is mounted a bushing 218 having ports 219, 220 which register with the ports 215 and 216, respectively. It is also provided with two ports 221 and 222 at right angles to the ports 219 and 220, as shown in Fig. 11. The port 221 communicates with a duct 223 which leads to the left hand end of the cylinder 185 as viewed in Fig. 10, and the port 222 communicates with a duct 224 which leads to the right hand end of such cylinder. The admission of oil to the ducts 221, 222 is controlled by a valve 225 which is fitted in the bushing 218 and is adapted to be rotated therein by means of a stem 226 that rises therefrom and has a crank arm 227 keyed thereto. The valve 225 is provided with a straight passage 228 therethrough, and with external grooves 229, 230 parallel with said straight passage 228. The passage 228 is adapted to aline with and connect the ports 219, 220 when the parts are in the position shown in Fig. 11, but it may be disconnected from said ports by rotating the valve, as indicated by dotted lines in said figure.

When rotated in clockwise direction as viewed in Fig. 11 the groove 229 will come into position to connect the ports 219 and 221, and the groove 230 will connect the ports 220, 222, or, if the valve be rotated in counterclockwise direction from the position shown in full lines in Fig. 11, the groove 229 will be utilized to connect the ports 220 and 221, while the groove 230 will connect the ports 219, 222. It will be apparent, therefore, that by means of the valve 225 the pipe 213 may be connected with either end of the cylinder 185, or may be connected directly with the pipe 212, by which latter connection the oil is entirely cut off from admission to the cylinder 185, and thus forms a continuous circuit with the pump, in which case, of course, the oil forced by the pump will simply circulate through the pump, the pipes 212, 213 and the valve 225, and consequently will have no effect on the piston 186 in the cylinder. This is a desirable provision as it relieves the pump from the great pressure that might otherwise be imposed upon it in the event that, for any reason, the pump was not immediately disconnected, as hereinafter described, from its driving connections after the piston 186 had moved to one or the other of its extreme positions to cause a raising or lowering of the load-sustaining platform.

When the valve 225 has been turned so as to connect the pipe 213 with the passage 221 and duct 223, and by which operation the pipe 212 will be connected with passage 222 and duct 224, oil from the pump will be forced into the left hand end of the cylinder as viewed in Fig. 10, while the oil that is in said cylinder at the opposite side of the piston will be discharged through the duct 224 and passage 222 into the pipe 212, which is the inlet pipe to the pump.

Consequently, the piston 186 will move toward the right as viewed in Fig. 10. By turning the valve 225 in the opposite direction from its neutral, or full line position as shown in Fig. 11, oil will be forced into the right hand end of the cylinder and will be exhausted through the duct 223 into the pipe 212, so that the piston will move in the opposite direction.

The valve stem 226 is rocked to control the operation of the valve, by means of the control lever 37, which, as shown in Fig. 7, is fulcrumed upon a pivot 231, and to its rear end is pivoted the upper end of a connecting rod 232 that, at its lower end, is pivotally connected with a rearwardly-extending arm 233 that is carried by a short shaft 234 which is mounted, in the construction shown, in the lower portion of the same bracket 203 in which is mounted the short rock-shaft 202 before mentioned. As best shown in Fig. 6, said shaft 234 also has secured to it two upright arms 235, 236—all three of said arms 233, 235 and 236 being keyed to the shaft so that they turn therewith. The arm 236 is connected by a rod 237 with the arm 227 carried by the valve stem 226, as best shown in Fig. 7, and, therefore, when the lever 37 is moved up or down the rocking of the shaft 234 that is effected thereby will rock the arm 236 and consequently swing the arm 227 forward or back, thereby rocking the valve stem 226 to control the admission of oil to the cylinder 185 as described—the direction in which the operating lever 37 is turned from its neutral position determining, of course, as will be understood from the foregoing explanation, the admission of oil at one side or the other of the piston in the cylinder, and consequently determining the movement of the load-supporting platform 56 to its raised or lowered position.

From the foregoing description it will be seen that by means of the lever 37 the load-sustaining platform 56 may be raised or lowered to any extent between the limits of its movement, that it may be stopped and held at any point, and that it may be reversed at any stage of its movement in any direction, for with the system comprising the cylinder, the pump casing and the connections interposed between those parts maintained full of oil, as will always be the case, it is evident that by so manipulating the lever 37 as to shut off the circulation of the oil, the piston in the cylinder can be held in the cylinder at any point therein. Of course, when the load-sustaining platform is in its uppermost or lowermost position it is desirable that the valve 225 shall be so turned as to afford a direct passage by means of it between the two pipes 212 and 213, so that in the event of the clutch that controls the pump not being promptly opened at this time, as should be the case, the oil will merely be caused to circulate freely and thereby relieve the pumping mechanism of any undue strains. Means are provided for automatically and positively turning the valve 225 at such times, such means comprising a link 238, which, as shown in Figs. 1, 4 and 7, is provided with a long slot 239, into which slot projects a laterally-extending pin 240 that is affixed to the rack-bar 79 whose backward and forward motion, as hereinbefore described, causes the rising and descending movements of the platform 56. The slot 239 is of such length that, as the rack-bar 79 approaches the limit of its motion in either direction, the pin 240 carried thereby will abut against one end of the slot and move the link correspondingly.

The link is pivotally connected at 241 with a short arm 242 that is integral with, or made fast to, a sleeve 243, (see Fig. 2) that is fulcrumed at 244, and with which sleeve is also formed, or has rigidly connected with it, a bent lever 245, to the upper end of which is pivotally connected a rod 246 that extends forward, as shown in Fig. 7, and is pivotally connected at its forward end with the upstanding arm 235 that is mounted on the rock-shaft 234. It will be evident that as the load-sustaining platform approaches the limit of its upward or downward movement the link 233, by reason of the engagement of the pin 240 with an end of the slot in said link, will, through the connections described, cause a rocking of the short shaft 234 that is carried by the bracket 203, and, inasmuch as the connecting rod that extends to the crank on the valve shaft 226 is necessarily moved whenever the short shaft 234 is rocked, it follows that the valve 225 must be turned to its neutral position, so that the supply of oil under pressure to the cylinder 185 is effectually cut off.

I do not consider it necessary to provide in connection with the driving mechanism for the truck any change-speed gearing, as I have found it sufficient in devices of this character to rely for differences in speeds forward or back upon operation of the usual throttle valve of the engine, and, as hereinbefore stated, I can effect such operation of that valve through the manipulation of the latch piece 41 that is carried by the lever 40, and which latch piece, as shown in Fig. 15, has connected with it a small rod 42. That rod will preferably have connected at its inner end a wire that, as indicated in Fig. 15 may preferably be provided with a flexible covering—such covered wire being indicated by 42ª, and, as shown in Fig. 7, will extend rearwardly and be suitably attached to said valve of the engine—the attachment as shown being through a crank 42ᵇ that is indicated in Fig. 7 by dotted lines. It is at times desirable, however, that the speed of the machine be controlled through the foot of the operator rather than by his hand, and to that end I have provided a foot lever 247, (see Fig. 2) which lies alongside of and is fulcrumed upon the same pivot, in the construction shown, as the foot lever 207 that controls the clutching device for the pump. This foot lever 247, like the other foot lever, has, as shown in Fig. 1, a stem 248 connected to its forward end and projecting up through an opening in the operator's platform 29, upon which stem is a head or foot piece 249. The rear end of the lever 247 is pivotally connected (see Fig. 6) with a long link 250 that extends upward just in rear of the dashboard 30, and at its upper end is connected with one arm of a bellcrank lever 251. As shown in Fig. 16, this bellcrank lever is loosely mounted, so as to turn thereabout as an axis, on a reduced end portion of the shaft 178 that is operated by a movement of the lever 40. The other end of the bellcrank lever has connected with it another link 252 that extends rearwardly, as shown in Fig. 7, and connects with the same arm 42ᵇ of the throttle valve device as does the connection 42ᵃ that is operated through the manipulation of the latch 41.

It will be evident that for speed controlling purposes the engine valve may be moved to the required degree equally effectively by the operator through either the hand latch 41, or the foot lever 247, whichever may be the more convenient, and that the operation of either one of these controlling devices is in no wise interfered with by the presence of the other one of such devices, due to the flexible character of one of the connections.

As hereinbefore stated, the foot lever 50 that rises through an opening in the operator's platform 29, is provided for the purpose of operating a brake, and, as such brake will normally be set to hold the machine against movement, the operator will, during the time that the machine is in motion, keep his foot on such brake lever to depress it. The brake mechanism comprises the drum 162 to which the universal connection 87 is bolted, as hereinbefore described, and which serves also as a brake drum in cooperation with an external brake band 253 (see Fig. 3) mounted in the usual way. One of the separated ends of this brake band is provided with a lever 254 connected therewith by a pivot 255, and operatively connected with a lug 256 on the opposite end of the brake band by a bolt 257. A spring 258 mounted on that bolt tends to move the separated ends of the brake band apart, and a spring 259 connected with the lever 254 and with the frame of the truck normally pulls said lever to the left as viewed in Fig. 3, so that the brake band is in operative engagement with the drum. The foot lever 50 is connected with the brake operating lever 254 by means of a connecting rod 260, one end of which is connected with the upper end of said lever, and the other end of which is connected with one arm of a bell-crank lever 261 mounted on a vertical pivot 262 supported by a frame member of the machine, as shown in Fig. 2.

The other arm of the bellcrank lever 261 is connected to a long rod 263, which extends to a point near the front of the truck, and is connected, as shown in Fig. 2, to an arm 264 secured to a rock-shaft 265 to which the foot lever 50 is also affixed. By this construction the spring 259 will normally hold the foot lever 50 in its uppermost position, and, consequently, when said foot lever is depressed, the brake lever 254 will be moved to release the band 253 from braking engagement with the drum.

In a lift truck of this description it is very desirable that the vehicle as a whole be as close coupled as possible, and as it is necessary to make the lifting platform of such length as to serve the purposes for which it is intended, it becomes of especial importance that the power plant be made relatively very short and as narrow as possible, so that the truck can be maneuvered through narrow aisles, or between piles of materials of various kinds, such as are usually found on the floors of manufacturing establishments, and also so that it will be capable of turning sharp corners. By the improved construction above described the power plant is made both short and narrow, since the motor and crank shaft extend longitudinally of the frame, and the parts driven by the crank shaft, including the countershaft that carries the clutch mechanism which drives the transmission gearing, the transmission mechanism itself, and the pump mechanism which serves the lifting and lowering devices, are all disposed beside the motor so that none of them projects to any considerable extent beyond it toward the lifting platform.

The arrangement by which the transmission mechanism is driven from the front end of the countershaft 127ᵃ, that is to say, the end nearest the operator's platform, contributes to that end. There is thus provided a much more compact power unit than would be had if the transmission gearing were arranged in line with the crank shaft, as is common in motor vehicle construction.

Inasmuch as the operation of the various parts and their relations one to the other have been explained in connection with the construction of the various details of the mechanism, it is not believed necessary to insert a description of the manner of operating the machine as a whole, as such description would be in large measure but a repetition of that which has already been given.

In this specification as well as in the claims hereinafter made I have referred to the operator's end of the truck as the front end thereof, as a convenient means of distinguishing between the two ends of the truck, but as the truck is intended to be run in either direction, as circumstances may require, obviously the words "front" and "rear" as used in the claims are not intended to have a directional significance so far as the travel of the truck is concerned, but rather to point out the relative location of the parts of the apparatus in connection with which those terms are used.

By placing the lifting platform over the propelling wheels and providing the lifting connections between the main frame and the lifting platform at opposite sides of said wheels, as described, strains due to lifting the load are balanced with respect to the rear axle, and also in transporting the load, it is similarly balanced. Therefore, the main frame is less likely to be strained, adequate traction is always maintained, and undue load is not thrown upon the steering wheels. The truck, moreover, handles more easily, and there is little danger of cramping or otherwise damaging the operating connections between the power plant and the lifting devices by reason of distortion of the frame incident to travel of the truck over uneven ground.

I claim:

1. A lift truck comprising in combination with a wheeled frame, a motor, of a lifting platform connected by pivoted arms with said frame whereby when said platform is moved vertically it is also given an endwise movement, a rocking member mounted on the frame and connected with said arms, a cylinder, a fluid-actuated piston in said cylinder, means actuated by said motor for forcing liquid into said cylinder to actuate said piston, a piston-rod extending from the piston and connected with said rocking member, a valve for controlling the flow of fluid under pressure to and from said cylinder, a pivoted lever connected with said valve, a link also connected with said lever and extending approximately parallel with said piston-rod, and a connection extending between said piston-rod and link and loosely connected with one of said parts and adapted to operatively connect them together as the piston-rod approaches the limit of its movement in either direction.

2. A lift truck comprising in combination with a wheeled frame, a motor, of a lifting platform connected by pivoted arms with said frame whereby when said platform is moved vertically it is also given an endwise movement, a rocking member mounted on the frame and connected with said arms, a cylinder, a fluid-actuated piston in said cylinder, means actuated by said motor for forcing liquid into said cylinder to actuate said piston, a piston-rod extending from the piston and connected with said rocking member, a valve for controlling the flow of fluid under pressure to and from said cylinder, a pivoted lever connected with said valve, a slotted link also connected with said lever and extending approximately parallel with said piston-rod, a pin carried by the piston-rod and projecting into the slot of the link and adapted by contact with either end of the slot to move said link longitudinally and cause a turning of the said lever that will close the valve.

3. A lift truck comprising in combination a wheeled frame, a lifting platform located over said frame, two rock-shafts journaled in bearings carried by said frame adjacent to the front and rear ends of the platform, a pair of arms fixedly connected at their lower ends with one of said rock-shafts and pivotally connected at their upper ends with the platform, and a pair of toggle levers interposed between the other rock-shaft and the platform, one member of each toggle lever being fixedly connected with its rock-shaft and the other member thereof being pivotally connected with the platform, and power-operated means on said frame for rocking both of said shafts.

4. A lift truck comprising a frame, dirigible and propelling wheels supporting said frame, a rising and falling lifting platform mounted on said frame over the propelling wheels, rock shafts mounted on said frame at opposite sides of the propelling wheels, a pair of arms carried by one of said rock shafts to rock therewith and pivotally connected with said platform, toggle means, including a pivoted link, connecting the other rock shaft with said platform at the opposite side of the propelling wheels, and power-operated means on said frame operatively connected with said rock-shafts to actuate the same.

5. The combination with a lift truck having a pair of wheels, a motor unit and a pump connected to said motor through an individual clutch, of a platform located over said wheels, a hydraulic cylinder disposed beneath said motor and adjacent said transmission, a piston in said cylinder, a valve connected between said pump and cylinder, means for operating said valve to cause said pump to move said piston in said cylinder to raise and lower said platform, and means controlled directly by the movement of said piston to the ends of the cylinder for operating said valve to disconnect the pump from the cylinder independently of the position of the platform.

6. The combination with a truck having a frame and a motor, of a pair of rock shafts journaled to said frame, bell cranks keyed to said shafts, a platform pivotally supported on the free ends of said bell cranks, an actuating shaft journaled to said frame, driving connections between said latter shaft and said rock shafts, a piston moved by power derived from said motor for rocking said actuating shaft to thereby raise and lower said platform, a valve for controlling the movement of said piston, and means controlled by the piston in its extreme positions for controlling said valve.

7. The combination with a truck having a frame, of a pair of rock shafts journaled to said frame, bell cranks keyed to said shafts, a platform pivotally supported on the free ends of said bell cranks, an actuating shaft journaled to said frame, driving connections between said latter shaft and said rock shafts, a manually operated means for actuating said valve to start said piston moving, and means controlled by the piston after it has moved a predetermined distance for automatically operating said valve to stop said piston.

8. A lift truck comprising, in combination, a wheeled frame, a vertically movable lifting platform located over said frame, an arm pivotally mounted about a fixed axis and pivotally connected with said platform adjacent one end thereof, a second arm pivotally mounted about a fixed axis adjacent the other end of the platform, a link pivotally connected to said second arm at a point spaced from the axis thereof and connecting said second arm with said platform whereby the platform permits relative angular movement of the two arms, and power means for simultaneously rotating both arms about their respective axes.

9. In a lift truck, a vertically movable platform, means for moving the same vertically, comprising a hydraulic cylinder, a piston therein, a fluid pressure pump, connections including valve means between the pump and the cylinder for controlling the application of pressure to the cylinder, a manually operable lever, linkwork controlled by the lever for controlling the valve, and means effective responsive to the full operation of the piston for controlling the application of pressure to the cylinder.

10. In a lift truck, a vertically movable platform, means for moving the same vertically, comprising a hydraulic cylinder, a piston therein, a fluid pressure pump, connections including valve means between the pump and the cylinder for controlling the application of pressure to the cylinder, a manually operable lever, linkwork controlled by the lever for controlling the valve, and means effective responsive to the full operation of the piston for actuating the linkwork and the valve to control the application of pressure to the cylinder.

11. A lift truck having an internal combustion engine for driving the same, a lifting platform, means for lifting the platform comprising a hydraulic cylinder, a piston therein, a rotary pump and valve means for supplying pressure to the cylinder, means including a clutch for connecting the pump to the engine, manually operable means for controlling the valve, and means automatically effective responsive to a predetermined movement of the piston for disconnecting the pump from the cylinder and maintaining the pressure on the cylinder.

ROBERT J. BURROWS.